(12) United States Patent
Nomura

(10) Patent No.: US 10,732,409 B2
(45) Date of Patent: Aug. 4, 2020

(54) SCREEN AND HEAD-UP DISPLAY DEVICE

(71) Applicant: Konica Minolta, Inc., Tokyo (JP)

(72) Inventor: Eiji Nomura, Kokubunji (JP)

(73) Assignee: Konica Minolta, Inc., Tokyo (JP)

( * ) Notice: Subject to any disclaimer, the term of this patent is extended or adjusted under 35 U.S.C. 154(b) by 154 days.

(21) Appl. No.: 16/078,608

(22) PCT Filed: Feb. 24, 2017

(86) PCT No.: PCT/JP2017/007086
§ 371 (c)(1),
(2) Date: Aug. 21, 2018

(87) PCT Pub. No.: WO2017/146206
PCT Pub. Date: Aug. 31, 2017

(65) Prior Publication Data
US 2019/0049726 A1     Feb. 14, 2019

(30) Foreign Application Priority Data

Feb. 25, 2016    (JP) .................................. 2016-034266

(51) Int. Cl.
*G02B 27/14*     (2006.01)
*G09G 5/00*      (2006.01)
(Continued)

(52) U.S. Cl.
CPC .......... *G02B 27/0101* (2013.01); *B60K 35/00* (2013.01); *G03B 21/56* (2013.01);
(Continued)

(58) Field of Classification Search
CPC .......... G02B 27/0101; G02B 2027/012; G02B 2027/013; G02B 2027/0194; B60K 35/00;
(Continued)

(56) References Cited

U.S. PATENT DOCUMENTS

2016/0070100 A1*  3/2016  Miura ..................... B60K 35/00
                                                           359/630
2018/0172991 A1*  6/2018  Iwashita ............. G02B 27/0101

FOREIGN PATENT DOCUMENTS

JP       2012-058688 A    3/2012
JP       2014-115417 A    6/2014

OTHER PUBLICATIONS

International Search Report issued in corresponding International Application No. PCT/JP2017/007086 dated May 16, 2017, with translation (6 pages).

(Continued)

*Primary Examiner* — William Choi
(74) *Attorney, Agent, or Firm* — Osha Liang LLP

(57) ABSTRACT

A screen for a head-up display device includes a main body layer sandwiched between a first concave optical surface located at an observation side and a second convex optical surface located at a side opposite to the observation side. A thickness of the main body layer becomes thinner from a center toward a periphery with regard to a lateral direction which is perpendicular to a reference plane, and a variation of the thickness of the main body layer with regard to a vertical direction parallel to the reference plane is different between the central part center and the peripheral part periphery with regard to the lateral direction.

12 Claims, 10 Drawing Sheets

(51) Int. Cl.
    *G02B 27/01*         (2006.01)
    *G03B 21/56*         (2006.01)
    *B60K 35/00*         (2006.01)

(52) U.S. Cl.
    CPC .. *B60K 2370/1529* (2019.05); *B60K 2370/23* (2019.05); *G02B 2027/012* (2013.01); *G02B 2027/013* (2013.01); *G02B 2027/0194* (2013.01)

(58) Field of Classification Search
    CPC ........ B60K 2370/1529; B60K 2370/23; G03B 21/56
    USPC .................................. 359/630, 631; 345/7–9
    See application file for complete search history.

(56) References Cited

OTHER PUBLICATIONS

Written Opinion of the International Searching Authority issued in corresponding International Application No. PCT/JP2017/007086 dated May 16, 2017 (4 pages).

\* cited by examiner

SCREEN AND HEAD-UP DISPLAY DEVICE

RELATED APPLICATIONS

This is a U.S. national stage of International Application No. PCT/JP2017/007086 filed on Feb. 24, 2017. This patent application claims the priority to Japanese patent application No. 2016-034266 filed on Feb. 25, 2016, the disclosure content of which is hereby incorporated by reference.

TECHNOLOGICAL FIELD

The present invention relates to a screen for displaying an image at the end of the line of sight and a head-up display device having incorporated therein.

BACKGROUND

A head-up display device is capable of displaying information in a manner overlapped with the background at the end of the line of sight. Incorporating such a head-up display device, for example, in an automobile allows for projecting, at the end of the line of sight such as a windshield, an image including information such as speed obtained by instruments in the vehicle while driving the automobile, which facilitates driving without changing the eyesight and may lead to accident prevention.

There is known a type of head-up display device including, for example, a combiner adhered inside a windshield, with the vertical cross section of the combiner being wedge-shaped and made relatively thinner at the lower part where a visual display device is located so as to prevent formation of a double image (Patent Literature1).

There is known a type of head-up display device including, for example, a combiner provided in an upright manner on the inside of a windshield in a manner separated from the windshield, with the radius of curvature being smaller at the observer's side (Patent Literature2).

However, the combiner according to Patent Literatures 1 and 2, has not sufficiently taken into consideration of the thickness of the lateral section and, even when the double image of the image in the vertical direction at the central part with regard to the lateral direction is dissolved, the double image in the periphery with regard to the lateral direction is not sufficiently dissolved, thereby resulting in degradation of the image quality as a whole. Particularly, significant degradation of the image quality occurs in the case with a wide viewing angle and a wide eye box.

PATENT LITERATURE

Patent Literature1: Japanese Patent Laid-Open No. 2012-58688
Patent Literature2: Japanese Patent Laid-Open No. 2014-115417

SUMMARY

One or more embodiments of the present invention provide a screen capable of preventing generation of a double image also a lateral direction, and improving the image quality as a whole, and a head-up display device having incorporated therein.

According to one or more embodiments of the present invention, a screen for a head-up display device has a main body layer sandwiched between a first concave optical surface located at an observation side and a second convex optical surface located at a side opposite to the observation side, wherein the thickness of the main body layer becomes thinner from the center toward the periphery with regard to a lateral direction which is perpendicular to a reference plane, and variation of the thickness of the main body layer with regard to a vertical direction parallel to the reference plane is different between the central part and the peripheral part with regard to the lateral direction. Note that the reference plane is a plane including an optical axis, and becomes a vertical plane when display light is incident from an upward or downward direction. In addition, the thickness of the main body layer relates to the direction parallel to the normal direction of the first optical surface at the center. Furthermore, the lateral direction is not limited to the horizontal direction.

According to one or more embodiments of the present invention, the head-up display device includes the aforementioned screen and a drawing unit that projects display light on the screen.

DETAILED DESCRIPTION

In the following, a screen and a head-up display device having incorporated therein according to one or more embodiments of the present invention will be described.

Figure 1A:
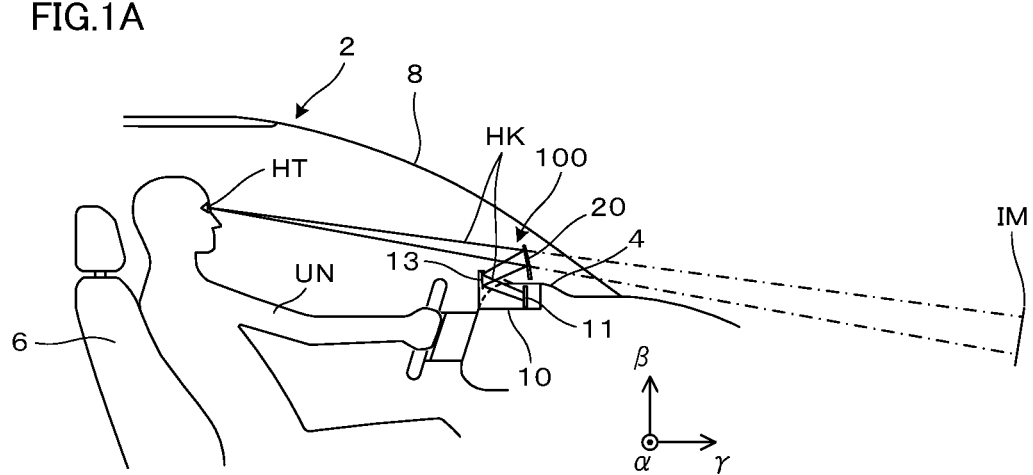
FIG. 1A is a side cross-sectional view illustrating a combiner, which is a screen of one or more embodiments, and a head-up display device having incorporated therein, in a state being mounted on a vehicle body.
Figure 1B:
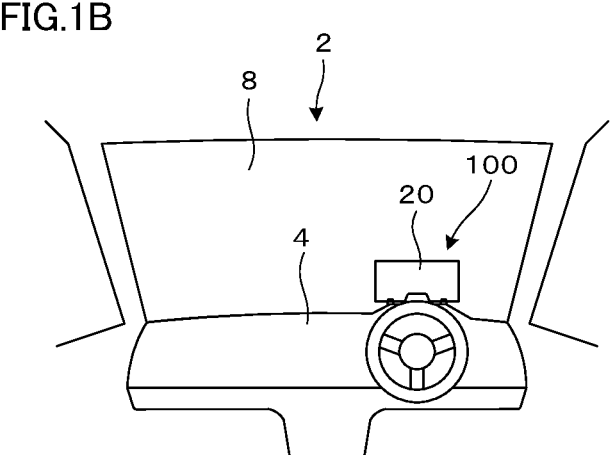
FIG. 1B is a front view illustrating the combiner or the like seen from the inside of the car.

FIGS. 1A and 1B are a conceptual side cross-sectional view and a front view illustrating a head-up display device 100 of one or more embodiments and its usage state. The head-up display device 100, which is intended to be mounted on in a vehicle body 2, includes a drawing unit 10 and a combiner 20.

The drawing unit 10, which is provided so as to be embedded in a dashboard 4 of the vehicle body 2, emits display light HK corresponding to an image including driving-related information toward the combiner 20. The combiner 20, which is a screen that functions as a semi-transparent concave mirror and provided in an upright manner on the dashboard 4 in a manner supported by a lower part end, reflects the display light HK from the drawing unit 10 to the backward of the vehicle body 2. In other words, the combiner 20 turns out to be a stand-alone type provided separately from a windshield 8. The display light HK reflected by the combiner (screen) 20 is guided to an eye box corresponding to a pupil HT and its peripheral position of a driver UN. The driver UN is allowed to observe the display light HK reflected by the combiner 20, i.e., a display image IM as a virtual image located ahead of the vehicle body 2. On the other hand, the driver UN is allowed to observe outside light transmitted through the combiner 20, i.e., a real image such as a scenery ahead. As a result, the driver UN is allowed to observe the display image (virtual image) IM including driving-related information formed by reflection of the display light HK by the combiner 20, in a manner overlapped with an outside image behind the combiner 20.

Figure 2:
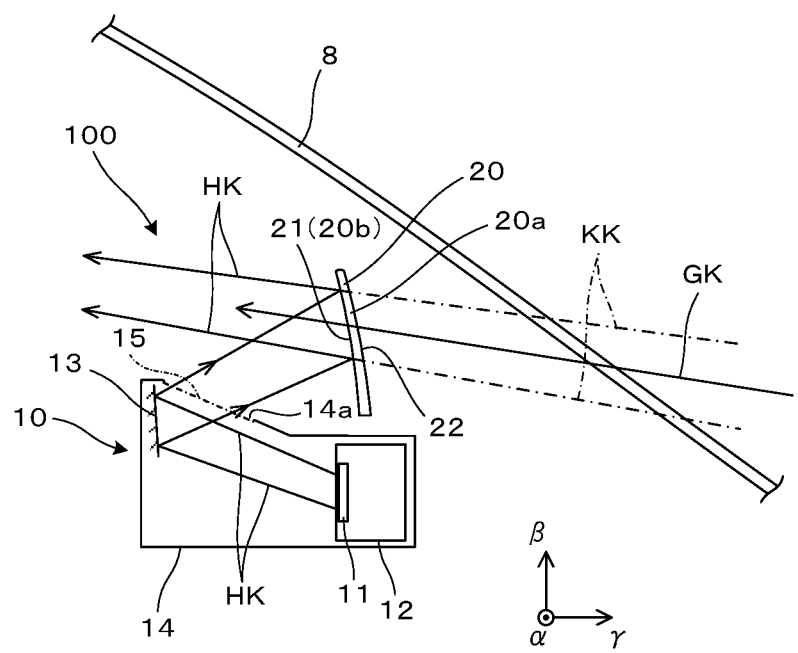
FIG. 2 is an enlarged side cross-sectional view illustrating the head-up display device in FIG. 1A.

FIG. 2 is a cross-sectional view illustrating an enlarged view of the head-up display device 100. Of the components included in the head-up display device 100, the drawing unit 10 has a drawing device 12 including liquid crystal display panel 11, a mirror 13, and a housing 14. The drawing device 12 has, besides the liquid crystal display panel 11, a display driving circuit that causes the liquid crystal display panel 11 to perform a display operation, a light source such as LED or the like that emits light for illuminating the liquid crystal display panel 11, and an optical equalization system or the like to that equalizes light from such a light source, although detailed description thereof being omitted. The mirror 13 may be convex, concave, or planar and, in the case of a curved surface, may be an aspheric surface, a free-form surface, or the like, without being limited to a spherical surface. The housing 14 has an aperture 14a that allows transmission of the display light HK therethrough, and the aperture 14a may have a film- or thin-sheet light transmission member 15 provided thereon.

The combiner 20, which is a plate-like member, has a first optical surface 21 provided at the observing side or a seat 6 (see FIG. 1A) side where the driver UN is sitting as the observer, and a second optical surface 22 provided at a side opposite to the observation side or at a side of the windshield 8. The first optical surface 21, being a concave curved surface, turns out to be an aspheric surface or a free-form surface. The second optical surface 22, being a convex curved surface (a concave curved surface when seen from the observer side), turns out to be an aspheric surface or a free-form surface. The first optical surface 21 has been obtained by forming a half-mirror coating 20b having a reflectivity of 20 to 30%, for example, on a main body layer 20a, which is a base member, and allows for transmitting outside light GK therethrough to a desired degree while reflecting the display light HK as appropriate. The second optical surface 22 turns out to have the main body layer 20a exposed therefrom without forming anti-reflection film (or anti-reflection coating). In such a case, it is possible to suppress formation of a double image while reducing cost by omitting the anti-reflection coating. However, the second optical surface 22 may also have anti-reflection film formed thereon, or may be covered with protection coating.

Figure 3A:
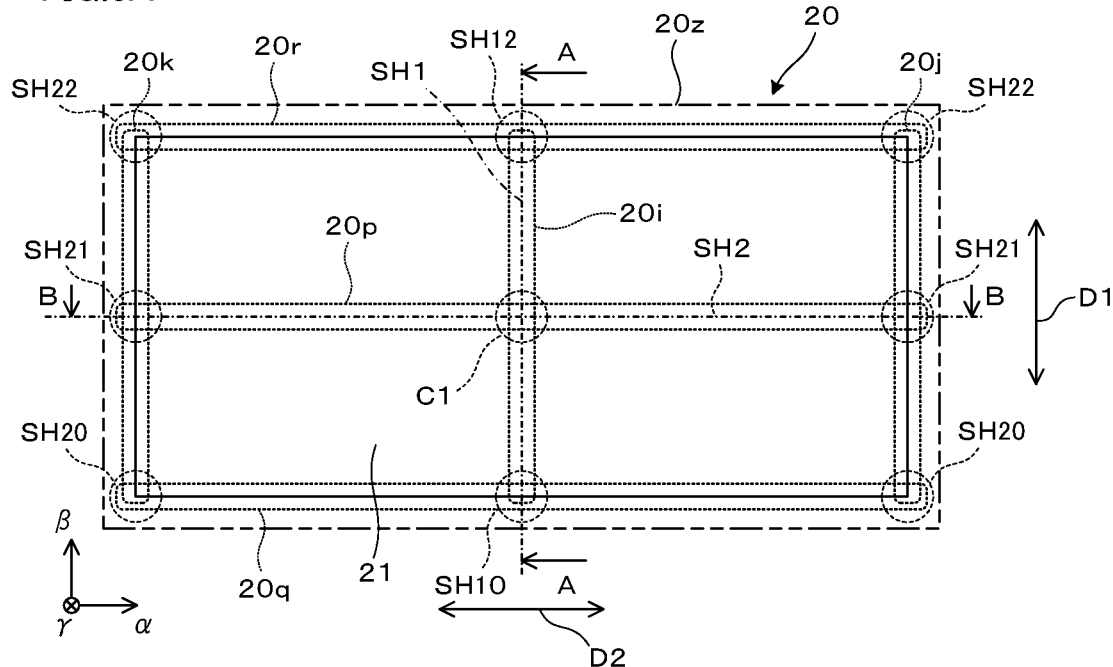
FIG. 3A is a front view of the combiner.
Figure 3B:
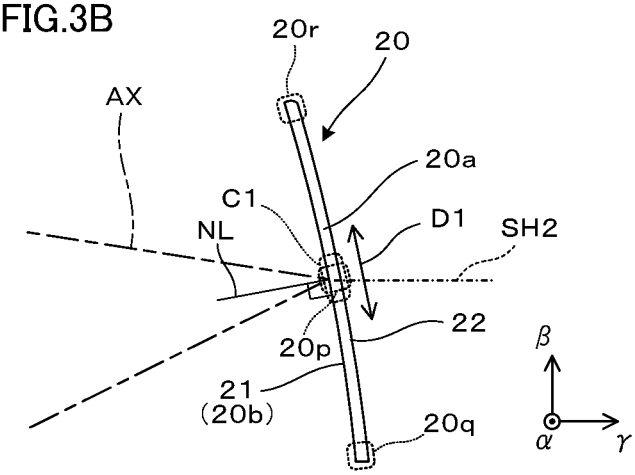
FIG. 3B is a cross-sectional view seen from arrow AA of the combiner illustrated in FIG. 3A.
Figure 3C:
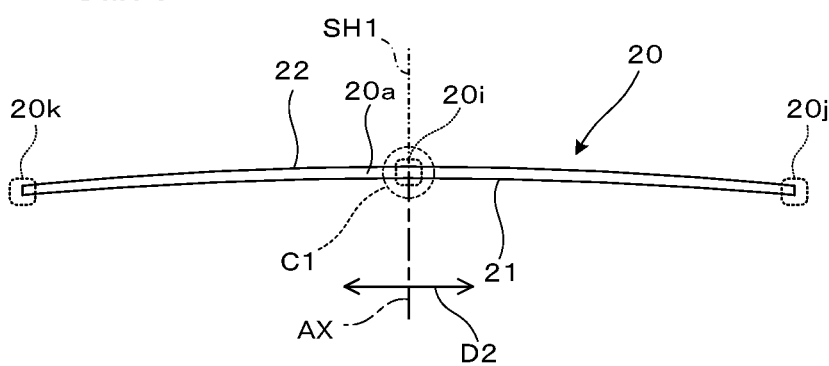
FIG. 3C is a cross-sectional view seen from arrow BB of the combiner illustrated in FIG. 3A.

FIGS. 3A to 3C are a front view of the combiner (screen) 20, a cross-sectional view seen from arrow AA, and a cross-sectional view seen from arrow BB. The combiner 20 is divided laterally into two parts by a virtual reference plane SH1 including an optical axis AX passing through a center C1, and a laterally symmetrical in shape. The combiner 20, although divided vertically into two parts by a virtual intersecting surface SH2 passing through the center C1 and extending horizontally, is not vertically symmetrical in shape. Here, the intersecting surface SH2 is a surface perpendicular to the reference plane SH1 and passing through the center C1, and is also a surface parallel to the α-γ surface. Note that, in the present specification, the optical axis AX is considered on the basis of the display light HK passing through the center C1 of the combiner 20 and guided to the center of an eye box SY (see FIG. 4C). In addition, the combiner 20 in the drawing illustrates only an optically effective region, and may have a frame part 20z around the effective region. In other words, the center C1 of the combiner 20 is the optical center and does not necessarily coincide with the center of contour.

Of the components included in the combiner 20, a central vertically-crossing zone 20i, which is a central part with regard to the lateral direction D2, is a part where the combiner 20 intersects with the reference plane SH1 or the vertical plane passing through the center C1. The central vertically-crossing zone 20i, which is curved as a whole in the longitudinal direction, extends in a vertical direction D1 inclined against the vertical β-axis direction. In addition, a pair of peripheral parts 20j and 20k with regard to a lateral direction D2 are separated at both ends in the ±α axis directions, and extend generally parallel to the central vertically-crossing zone 20i, both being curved as a whole in the longitudinal direction.

Of the components of the combiner 20, a central laterally-crossing zone 20p, which is the central part with regard to the vertical direction D1, is a part where the combiner 20 intersects with the intersecting surface SH2, is curved as a whole in the longitudinal direction. A pair of upper and lower vertical ends 20q and 20r sandwiching the central laterally-crossing zone 20p extend in the lateral direction D2 in parallel to the central laterally-crossing zone 20p, both being curved as a whole in the longitudinal direction.

Although a virtual image is displayed by reflection on the first optical surface 21, a secondary virtual image is also formed by reflection on the second optical surface 22, and therefore the combiner 20 causes the subsidiary virtual image to overlap with the original virtual image in terms of size and position to prevent formation of a double image due to the subsidiary virtual image. In other words, the size and position of the virtual image formed on one hand by the display light HK reflected by the first optical surface 21 are caused to coincide with the size and position of the virtual image formed on the other hand by the display light HK2 transmitted through the first optical surface 21 and reflected by the second optical surface 22. In other words, it turns out that the display light HK emitted from the same display point and reflected by the first optical surface 21, and the display light HK2 transmitted through the first optical surface 21 and reflected by the second optical surface 22 are guided to the eye box SY side as though having been emitted from a same virtual image point corresponding to the display point. That is, the display lights HK and HK2 emitted from the drawing unit 10 toward different directions are guided as though having been emitted from the same virtual image point. As a result, the cross-sectional shape of the combiner 20 has the following characteristics.

First, the thickness of the main body layer 20a in the combiner 20 turns out to become thinner from the center toward the periphery with regard to the lateral direction D2. Specifically, in the central laterally-crossing zone 20p extending in the lateral direction D2 at the center of the vertical direction D1, for example, the thickness of the main body layer 20a, which is thickest at the center C1, gradually becomes thinner toward a lateral-end region SH21, and turns out to be thinnest at the lateral-end region SH21. Similarly to the central laterally-crossing zone 20p, the upper and lower vertical ends 20q and 20r, which are thickest at a central lower part SH10 and a central upper part SH12, becomes gradually thinner toward a lateral-end lower region SH20 or a lateral-end upper region SH22 of the four corners, and turns out to be thinnest at the lateral-end lower region SH20 or the lateral-end upper region SH22. In the foregoing description, the thickness of the main body layer 20a is considered in a direction parallel to the normal NL direction (see FIG. 3B) of the first optical surface 21 at the center C1.

In addition, the thickness of main body layer 20a in the combiner 20 becomes thinner from one end at the lower side toward the other end at the upper side corresponding to the direction in which the display light HK is diagonally incident with regard to the vertical direction D1. Accordingly, it is possible to suppress formation of a double image in respective parts in the vertical direction D1. Specifically, in the central vertically-crossing zone 20i extending in the vertical direction D1 at the center of the lateral direction D2, for example, the thickness of the main body layer 20a, which is thickest at the central lower part SH10, gradually becomes thinner toward the center C1 and the central upper part SH12, and turns out to be thinnest at the central upper part SH12. Similarly to the central vertically-crossing zone 20i, the peripheral parts 20j and 20k, which are thickest at the lateral-end lower region SH20, gradually becomes thinner toward the lateral-end region SH21 and the lateral-end upper region SH22, and turns out to be thinnest at the lateral-end upper region SH22.

Furthermore, variation of the thickness of the main body layer 20a with regard to the vertical direction D1 in the central vertically-crossing zone 20i is different from the variation of the thickness of the main body layer 20a with regard to the vertical direction D1 in the peripheral parts 20j and 20k.

Figure 4A:
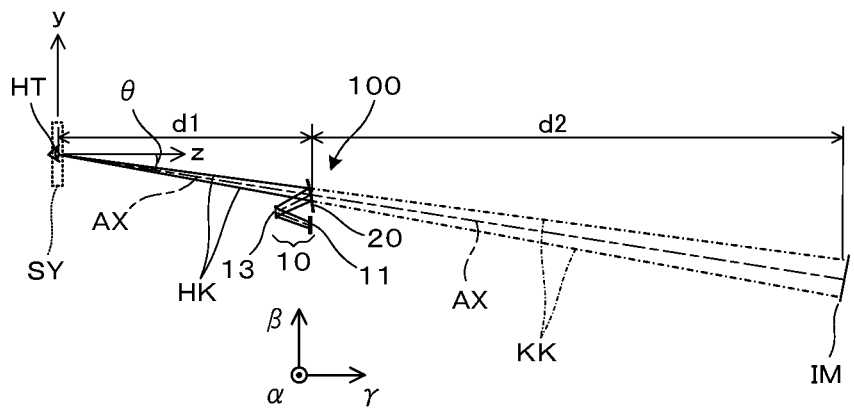
FIG. 4A is a cross-sectional view illustrating image formation by the head-up display device.
Figure 4B:
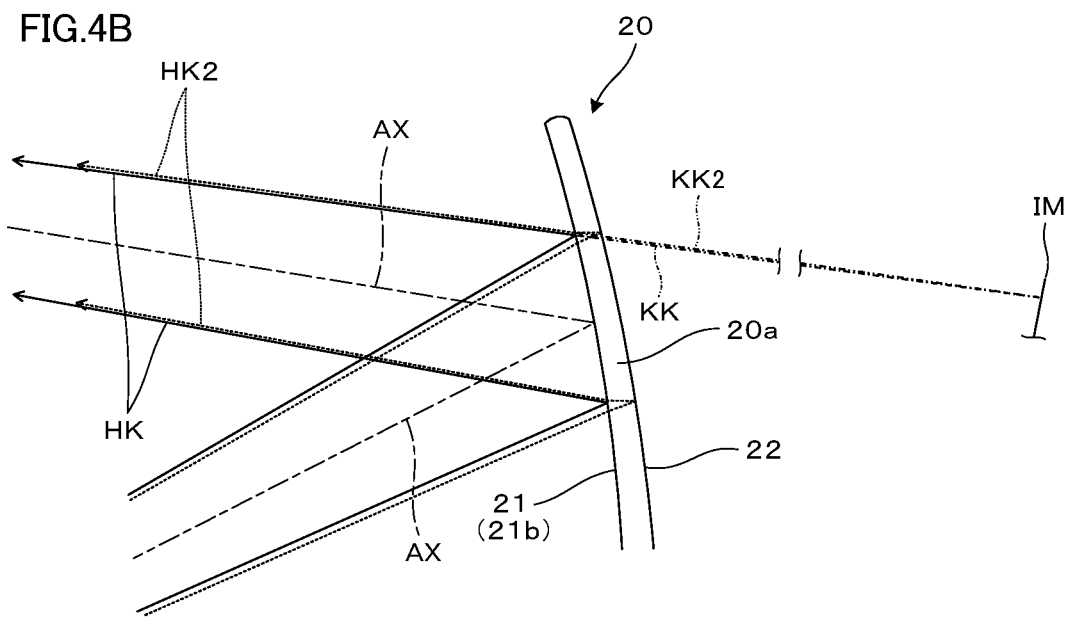
FIG. 4B is an enlarged view illustrating display light reflected by the combiner.
Figure 4C:
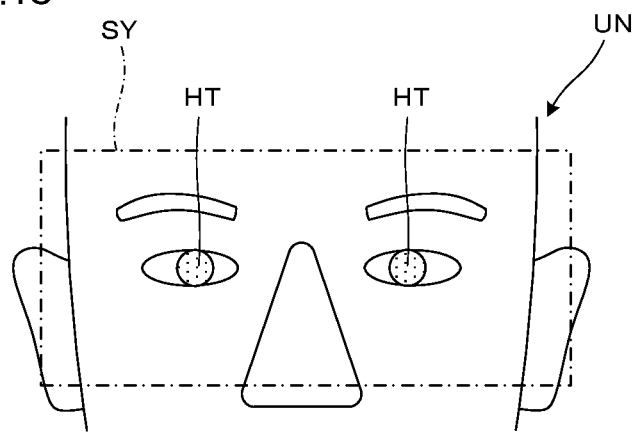
FIG. 4C is a diagram illustrating an eye box capable of observing a virtual image.

FIG. 4A is a cross-sectional view illustrating an optical configuration of the head-up display device 100 and image formation by the device, and FIG. 4B is a cross-sectional view illustrating the display light HK reflected by the combiner 20. As illustrated in the drawings, the display light HK reflected by the combiner 20 is guided to the pupil HT of the driver UN. Here, a virtual image light beam KK, which is an extension of the display light HK behind the combiner 20, forms a display image IM at a predetermined position ahead of the pupil HT of the driver UN. Note that the distance d1 from the pupil HT to the combiner 20 is assumed to be in an extent of 0.5 to 1 m, for example, depending on the specification of the vehicle body 2, the distance d2 from the combiner 20 to the display image IM is assumed to be in an extent of 1 m or more, for example, and the angle of depression θ looking down on the display image IM is assumed to be in an extent of 10° to 15°. In addition, the eye box SY illustrated in FIG. 4C is configured to cover the position of the pupil HT of the standard driver UN, with the size being 10 to 15 cm laterally and 5 to 8 cm longitudinally, for example.

The first optical surface 21 provided at the pupil HT side of the combiner 20 projects, onto the pupil HT as the display image IM with little distortion, the image formed on the liquid crystal display panel 11 via the mirror 13. On this occasion, the first optical surface 21 is capable of forming the display image IM with no distortion due to its optical surface shape. On the other hand, the second optical surface 22 provided on the opposite side of the pupil HT of the combiner 20 partially reflects the display light HK transmitted through and diverted at the first optical surface 21. The display light reflected by the second optical surface 22 provided behind after divergence (referred to as secondary display light HK2 for convenience in the following) is transmitted through the first optical surface 21 to be incident on the pupil HT, and therefore may be possibly superimposed with the display image IM to form a double image. However, when the secondary display light HK2 reflected by the second optical surface 22 travels as though having been emitted from a same point on the display image IM in relation with the original display light HK, the virtual image formed by the display light HK overlaps with the virtual image formed by the secondary display light HK2, whereby formation of a double image may be avoided. In other words, as conceptually illustrated in FIG. 4B, it suffices to cause the display light HK to extend along the extended line of the original virtual image light beam KK, and cause the secondary display light HK2 to extend along the extended line of the other virtual image light beam KK2 forming a small angle against the original virtual image light beam KK. On this occasion, it suffices to consider the relation between the display light HK and the secondary display light HK2 in such a range that both are simultaneously incident on the pupil HT of the driver UN. To control the direction of travel of the secondary display light HK2 in the aforementioned manner, the curvature or inclination angle of the second optical surface 22 and the thickness of the main body layer 20a are adjusted on the basis of the first optical surface 21. As a result, the thickness of the main body layer 20a corresponding to the space between the second optical surface 22 and the first optical surface 21 becomes thinner from the center toward the periphery with regard to the lateral direction D2, as has been described referring to FIGS. 3A to 3C, and variation of the thickness of the main body layer 20a with regard to the vertical direction D1 turns out to be different between the central part and the peripheral part with regard to the lateral direction D2. Furthermore, the thickness of the main body layer 20a turns out to b thinner from the lower end toward the upper end in the vertical direction D1, at respective positions with regard to the lateral direction D2.

According to the screen or the combiner 20 of one or more embodiments described above, the thickness of the main body layer 20a becomes thinner from the center toward the periphery with regard to the lateral direction D2 or the α direction, which is perpendicular to the reference plane SH1, and also the variation of the thickness of the main body layer 20a with regard to the vertical direction D1 or the β direction, which is parallel to the reference plane SH1, is different between the central part and the peripheral part with regard to the lateral direction D2, whereby it is possible to suppress formation of a double image more in respective parts of the center and the periphery, and to improve the image quality all over the eye box SY.

In addition, the head-up display device 100 of one or more embodiments includes the screen or the combiner 20 described above, whereby it is possible to suppress formation of a double image in respective parts of the center and the periphery, and to improve the image quality all over the eye box SY.

EXAMPLES

In the following, specific examples of the head-up display device according to one or more embodiments of the present invention will be described.

In the data of the example described below, Si (i=0, 1, 2, 3, . . . ) indicates the i-th surface counted from the virtual image side forming the display image IM (the virtual image side of the display image IM being the 0-th surface). The first and the second surfaces S1 and S2 following the 0-th surface S0 corresponding to the virtual image side are virtual surfaces, and the third side S3 corresponds to the pupil HT.

The arrangement of each surface Si is specified by surface apex coordinates (x, y, z) and a rotation angle (ADE), respectively. The surface apex coordinates of each surface Si are expressed by coordinates (x, y, z) of the origin of a local Cartesian coordinate system (X, Y, Z) in a global Cartesian coordinate system (x, y, z), with the surface apex being the origin of the local Cartesian coordinate system (X, Y, Z) (unit in mm). In addition, the inclination of each surface Si is expressed by the ADE around the X-axis (X-rotation) or the rotation angle centered on the surface apex. Note that the unit of rotation angle is assumed as "°" (degrees), and the counterclockwise direction seen from the positive direction of an X-axis is assumed as the positive direction of the rotation angle of the X-rotation. In addition, the global Cartesian coordinate system (x, y, z) turns out to be an absolute coordinate system that coincides with the local Cartesian coordinate system (X, Y, Z) of the pupil HT or pupil surface (third surface S3). In other words, arrangement data of each surface Si is expressed by a global coordinate system with the pupil surface center being the origin. Note that, in the pupil surface (third surface S3), the direction from the pupil HT toward the combiner 20 is the +Z direction or the +z direction, the upward direction relative to the pupil HT is the +Y direction or the +y direction, and the rightward direction relative to the pupil HT is the +X direction or the +x direction. In other words, the X-direction turns out to be parallel to the α direction illustrated in FIG. 4A, and the Y-direction turns out to be parallel to the β direction illustrated in FIG. 4A.

In respective examples, the fourth surface S4 corresponding to the combiner 20 and the fifth surface S5 corresponding to the mirror 13 are free-form surfaces, and the free-form surface shape is expressed by the following "formula 1", with the apex of the surface being the origin, taking the Z axis in the optical axis direction, and X and Y denoting the heights in directions perpendicular to the optical axis:

$$Z = \frac{cR^2}{1+\sqrt{1-(1+k)c^2R^2}} + \sum_{j=2}^{66} C_j X^m Y^n \quad \text{[Formula 1]}$$

$$j = \frac{(m+n)^2 + m + 3n}{2} + 1$$

where,
c: apex curvature (c=1/R)
k: conic constant
$C_j$: coefficient of $X^m Y^n$
R: Y radius of curvature In the following, specific examples of the head-up display device of one or more embodiments of the present invention will be described.

Example 1

Basic specifications of the head-up display device of an example 1 are listed in the following table 1.

TABLE 1

| | |
|---|---|
| reference wavelength | 520 nm |
| eye box size | X direction: −50 mm~+50 mm × Y direction: −14 mm~+11 mm |
| LCD size | X direction: 39.8 mm × Y direction: 22.4 mm |

Data of the optical surface or the like of the example 1 are listed in the following table 2.

TABLE 2

| | | | | arrangement and coordinates of surface | | | | | |
|---|---|---|---|---|---|---|---|---|---|
| surface number | corresponding item | radius of cuevature | space between surfaces | x | y | z | ADE | cartesian coordinate system | reference surface number |
| S0 (object) | virtual image | ∞ | −2538.567 | | | | | local | |
| S1 | | ∞ | 0 | | | | 10.000 | local | |
| S2 | | ∞ | 0 | 0.000 | 0.000 | 0.000 | 0.000 | local | |
| S3 | diaphragm surface (φ 5 mm) | ∞ | 0 | 0.000 | 0.000 | 0.000 | −10.000 | global | S2 |
| S4 | combiner (first optical surface) | see table below | | 0.000 | −141.060 | 800.000 | 10.000 | global | S2 |

TABLE 2-continued

| | | | | arrangement and coordinates of surface | | | | | |
|---|---|---|---|---|---|---|---|---|---|
| surface number | corresponding item | radius of cuevature | space between surfaces | x | y | z | ADE | cartesian coordinate system | reference surface number |
| S5 | mirror | see table below | | 0.000 | −230.000 | 646.255 | 0.002 | global | S2 |
| S6 (image surface) | LCD | ∞ | | 0.000 | −287.304 | 745.690 | 0.000 | global | S2 |

Surface data of the combiner part of the example 1 are listed in the following table 3. The "*" in the table expresses the product, and the "^" expresses the exponential (the same goes for the following examples). Note that the space between a pair of surfaces forming the combiner is 3.0 mm, the material of the combiner is polycarbonate (nd=1.5869, vd=30.0), and the optical surface size is 148 mm in the X-direction, and 68 mm in the Y-direction.

TABLE 3

| | Cj | first surface (concave surface) | second surface (convex surface) |
|---|---|---|---|
| Y radius of cuevature R | | −4.099274E+02 | −4.115342E+02 |
| conic constant | C1 | −1.800271E−01 | −5.858534E−01 |
| X | C2 | 0.000000E+00 | 0.000000E+00 |
| Y | C3 | 0.000000E+00 | 5.936875E−04 |
| X^2 | C4 | 4.868318E−04 | 4.855998E−04 |
| X*Y | C5 | 0.000000E+00 | 0.000000E+00 |
| Y^2 | C6 | 6.279177E−04 | 6.272233E−04 |
| X^3 | C7 | 0.000000E+00 | 0.000000E+00 |
| X^2*Y | C8 | 6.070492E−07 | 6.432424E−07 |
| X*Y^2 | C9 | 0.000000E+00 | 0.000000E+00 |
| Y^3 | C10 | 1.001214E−06 | 1.059070E−06 |
| X^4 | C11 | 1.817088E−09 | 1.817088E−09 |
| X^3*Y | C12 | 0.000000E+00 | 0.000000E+00 |
| X^2*Y^2 | C13 | 4.272311E−09 | 4.272311E−09 |
| X*Y^3 | C14 | 0.000000E+00 | 0.000000E+00 |
| Y^4 | C15 | 3.863658E−09 | 3.863658E−09 |
| X^5 | C16 | 0.000000E+00 | 0.000000E+00 |
| X^4*Y | C17 | −8.761324E−12 | −8.761324E−12 |
| X^3*Y^2 | C18 | 0.000000E+00 | 0.000000E+00 |
| X^2*Y^3 | C19 | 2.004210E−11 | 2.004210E−11 |
| X*Y^4 | C20 | 0.000000E+00 | 0.000000E+00 |
| Y^5 | C21 | 6.310483E−12 | 6.310483E−12 |

The surface data of the mirror part of the example 1 are listed in the following table 4.

TABLE 4

| | Cj | reflection surface |
|---|---|---|
| Y radius of cuevature R | | 9.500313E+02 |
| conic constant | C1 | −3.205652E+01 |
| X | C2 | 0.000000E+00 |
| Y | C3 | 0.000000E+00 |
| X^2 | C4 | −4.110722E−04 |
| X*Y | C5 | 0.000000E+00 |
| Y^2 | C6 | −1.072301E−04 |
| X^3 | C7 | 0.000000E+00 |
| X^2*Y | C8 | 3.191371E−06 |
| X*Y^2 | C9 | 0.000000E+00 |
| Y^3 | C10 | 4.406605E−06 |
| X^4 | C11 | 1.308794E−08 |
| X^3*Y | C12 | 0.000000E+00 |
| X^2*Y^2 | C13 | 8.932960E−10 |
| X*Y^3 | C14 | 0.000000E+00 |
| Y^4 | C15 | −6.389405E−09 |
| X^5 | C16 | 0.000000E+00 |
| X^4*Y | C17 | −2.825664E−10 |
| X^3*Y^2 | C18 | 0.000000E+00 |
| X^2*Y^3 | C19 | 1.226848E−10 |
| X*Y^4 | C20 | 0.000000E+00 |
| Y^5 | C21 | −9.147205E−11 |

Figure 5A:
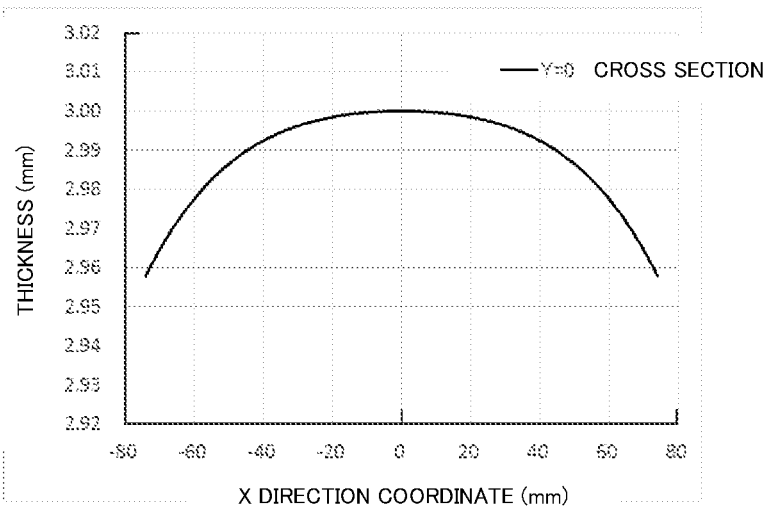
FIG. 5A is a chart illustrating the thickness distribution in the lateral direction along a central lateral cross section of the combiner in a first example.
Figure 5B:
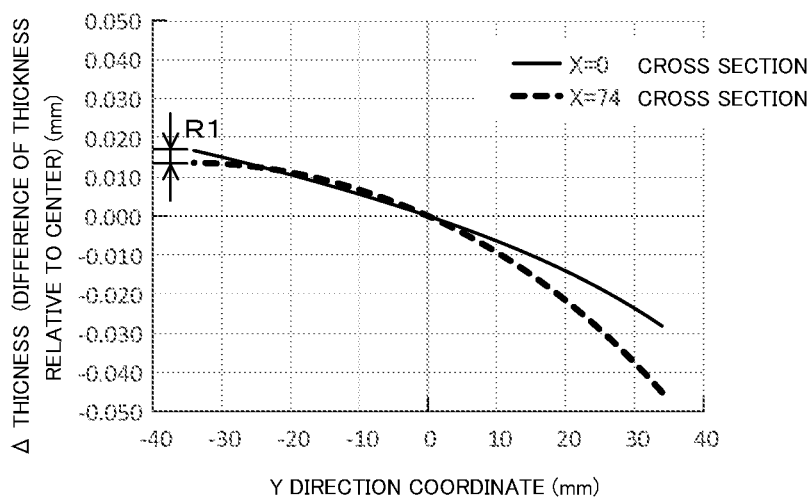
FIG. 5B is a chart illustrating the thickness distribution in the vertical direction of the combiner of the first example.

FIG. 5A illustrates the thickness in the lateral cross section of the combiner 20 of the example 1 and FIG. 5B illustrates the thickness in the vertical cross section of the combiner 20 of the example 1. The combiner 20 of the example 1 has a relatively large curvature and a large enlargement rate. In the chart of FIG. 5A, the lateral axis indicates the lateral coordinates and the vertical axis indicates the thickness of the combiner 20. Additionally, in FIG. 5B, the horizontal axis indicates vertical coordinates and the vertical axis indicates the relative thickness of the combiner 20. The curve illustrated as a solid line in FIG. 5B indicates the variation of thickness in the vertical direction D1 at the center with regard to the lateral direction D2 of the combiner 20, and the curve illustrated as a dotted line indicates the variation of thickness in the vertical direction D1 at the periphery with regard to the lateral direction D2 of the combiner 20. Specifically, the solid line indicates the variation of thickness in the central vertically-crossing zone 20i of the combiner 20 illustrated in FIG. 3A, and the dotted line indicates the variation of thickness in the peripheral parts 20j of the combiner 20 illustrated in FIG. 3A. As can be clearly seen in FIG. 5B, with regard to the thickness of the main body layer 20a of the combiner 20, the variation rate (absolute value) of the thickness in the vertical direction D1 is relatively larger in the +Y or the upper end 20r (see FIG. 3A) corresponding to the other end than in the −Y or the lower end 20q (see FIG. 3A) corresponding to one end. In addition, with regard to the thickness in the vertical direction D1 of the main body layer 20a of the combiner 20, the difference between the variation rates of the thickness in the vertical direction D1 at both the upper and the lower ends is larger in the peripheral parts 20j and 20k indicated by the dotted line than in the central vertically-crossing zone 20i with regard to the lateral direction D2 indicated by the solid line. Accordingly, it is possible to further suppress formation of a double image in respective parts in the lateral direction D2. Furthermore, the thickness, at the lower end 20q corresponding to one end of the main body layer 20a based on the central laterally-crossing zone 20p passing through the center C1 of the vertical direction D1 and extending in the lateral direction D2, i.e., the amount of increase of thickness, is smaller by R1 in the peripheral part, i.e., the lateral-end lower region SH20 than in the central part with regard to the lateral direction D2, i.e., the central lower part SH10.

Figure 5C:
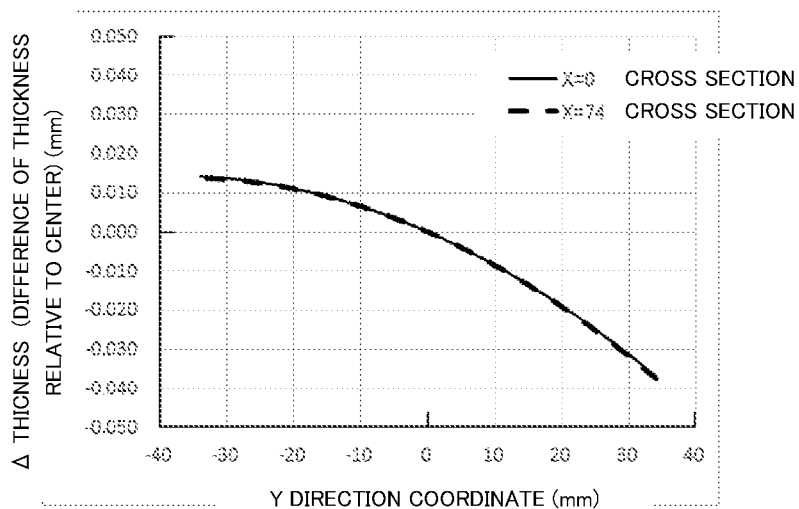
FIG. 5C is a chart illustrating the thickness distribution in the vertical direction of the combiner of a first comparative example.

Referring to FIG. 5C, the thickness in the vertical cross section of the combiner 20 of the comparative example 1 will be described. In such a case, the variation of thickness (solid line) along the vertical direction D1 in the center with regard to the lateral direction D2 of the combiner 20 coincides with the variation of thickness (dotted line) along the vertical direction D1 in the periphery with regard to the lateral direction D2 of the combiner 20.

Figure 6A:
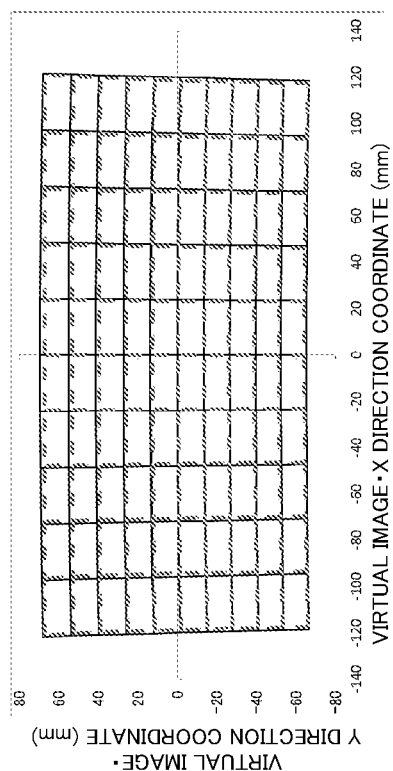
FIG. 6A illustrates a lattice image displayed using the combiner of the first example in a state being observed at the center of the eye box.
Figure 6B:
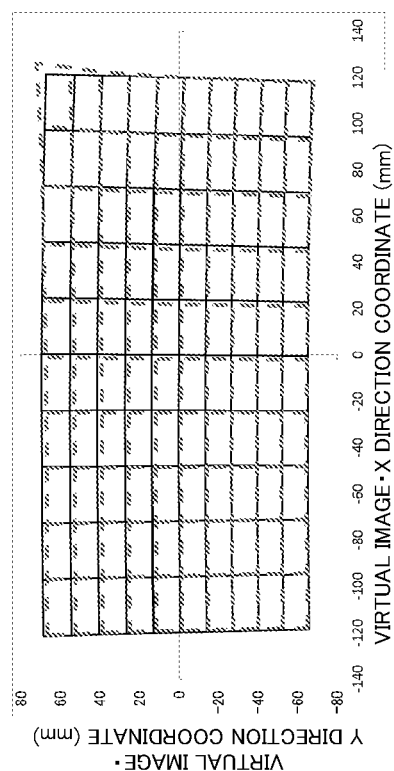
FIG. 6B illustrates the lattice image displayed using the combiner of the first example in a state being observed at a diagonally upper part of the eye box.

FIG. 6A illustrates a lattice image displayed using the combiner 20 of the example 1 in a state being observed at the center of the eye box SY, and FIG. 6B illustrates a lattice image displayed using the combiner 20 of the example 1 in a state being observed at a diagonally upper part of the eye box SY. As illustrated in FIG. 6A, it can be seen that formation of a double image is avoided in the image being observed at the center of the eye box SY, because the image formed by the dominant display light HK indicated by the solid line generally overlaps with the image formed by the secondary display light HK2 indicated by the dotted line. In addition, as illustrated in FIG. 6B, it can also be seen that formation of a double image is avoided in the image being observed at a corner of the eye box SY, because the image formed by the dominant display light HK indicated by the solid line generally overlaps with the image formed by the secondary display light HK2 indicated by the dotted line.

Figure 6C:
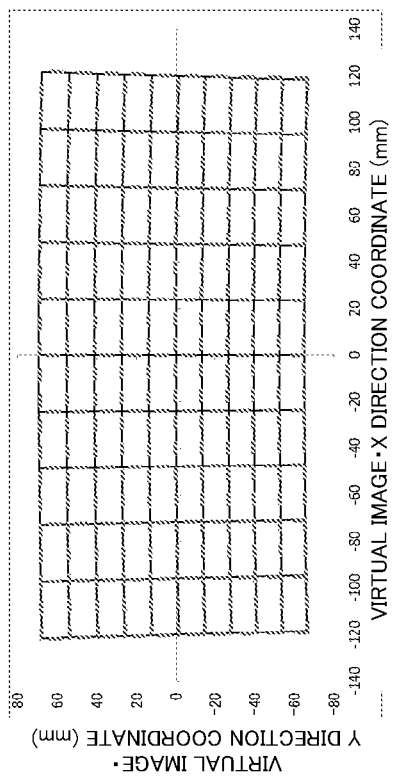
FIG. 6C illustrates the lattice image of the first comparative example in a state being observed at the center of the eye box.
Figure 6D:
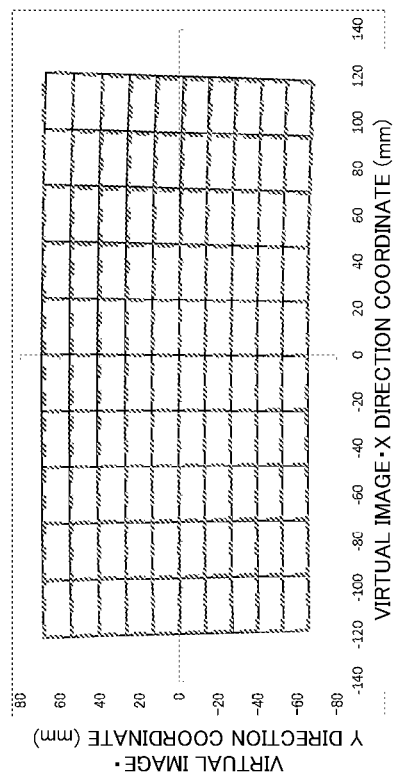
FIG. 6D illustrates the lattice image of the first comparative example in a state being observed at a diagonally upper part of the eye box.

FIG. 6C illustrates a lattice image displayed using the combiner 20 of the comparative example 1 in a state being observed at the center of the eye box SY, and FIG. 6D illustrates a lattice image displayed using the combiner 20 of the comparative example 1 in a state being observed a diagonally upper part of the eye box SY. As illustrated in FIG. 6C, it can be seen that an outstanding double image has been formed in the image observed at the center of the eye box SY, because the image formed by the dominant display light HK indicated by the solid line is displaced as a whole in a blurred manner from the image formed by the secondary display light HK2 indicated by the dotted line. In addition, as illustrated in FIG. 6D, it can also be seen that an outstanding double image has been formed in the image observed at a corner of the eye box SY, because the image formed by the dominant display light HK indicated by the solid lines displaced as a whole in a blurred manner from the image formed by the secondary display light HK2 indicated by the dotted line.

Example 2

Basic specifications of the head-up display device of an example 2 are listed in the following table 5.

TABLE 5

| | |
|---|---|
| reference wavelength | 520 nm |
| eye box size | X direction: −50 mm~+50 mm × Y direction: −15 mm~+15 mm |
| LCD size | X direction: 39.8 mm × Y direction: 22.4 mm |

Data of the optical surface or the like of the example 2 are listed in the following table 6.

TABLE 6

| | | | | arrangement and coordinates of surface | | | | | |
|---|---|---|---|---|---|---|---|---|---|
| surface number | corresponding item | radius of cuevature | space between surfaces | x | y | z | ADE | cartesian coordinate system | reference surface number |
| S0 (object) | virtual image | ∞ | −2538.567 | | | | | local | |
| S1 | | ∞ | 0 | | | | 10.000 | local | |
| S2 | | ∞ | 0 | 0.000 | 0.000 | 0.000 | 0.000 | local | |
| S3 | diaphragm surface (φ 5 mm) | ∞ | 0 | 0.000 | 0.000 | 0.000 | −10.000 | global | S2 |
| S4 | combiner (first optical surface) | see table below | | 0.000 | −141.060 | 800.000 | 10.000 | global | S2 |
| S5 | mirror | see table below | | 0.000 | −206.400 | 690.000 | 3.120 | global | S2 |
| S6 (image surface) | LCD | ∞ | | 0.000 | −252.000 | 795.411 | 0.000 | global | S2 |

Surface data of the combiner part of the example 2 are listed in the following table 7. Note that the space between a pair of surfaces forming the combiner is 3.0 mm, the material of the combiner is polycarbonate (nd=1.5869, vd=30.0), and the optical surface size is 148 mm in the X-direction, and 73 mm in the Y-direction.

TABLE 7

| | Cj | first surface (concave surface) | second surface (convex surface) |
|---|---|---|---|
| Y radius of cuevature R | | ∞ | ∞ |
| conic constant | C1 | 0.000000E+00 | 0.000000E+00 |
| X | C2 | 0.000000E+00 | 0.000000E+00 |
| Y | C3 | 0.000000E+00 | 9.217458E−04 |
| X^2 | C4 | −1.084093E−03 | −1.075852E−03 |
| X*Y | C5 | 0.000000E+00 | 0.000000E+00 |
| Y^2 | C6 | −9.007398E−04 | −8.967213E−04 |
| X^3 | C7 | 0.000000E+00 | 0.000000E+00 |
| X^2*Y | C8 | 7.552202E−07 | 7.417251E−07 |
| X*Y^2 | C9 | 0.000000E+00 | 0.000000E+00 |
| Y^3 | C10 | 1.514743E−06 | 1.482545E−06 |
| X^4 | C11 | −2.394723E−10 | −2.394723E−10 |
| X^3*Y | C12 | 0.000000E+00 | 0.000000E+00 |
| X^2*Y^2 | C13 | −4.628489E−10 | −4.628489E−10 |
| X*Y^3 | C14 | 0.000000E+00 | 0.000000E+00 |
| Y^4 | C15 | −1.767370E−11 | −1.767370E−11 |
| X^5 | C16 | 0.000000E+00 | 0.000000E+00 |
| X^4*Y | C17 | −1.761966E−11 | −1.761966E−11 |
| X^3*Y^2 | C18 | 0.000000E+00 | 0.000000E+00 |
| X^2*Y^3 | C19 | 4.162014E−11 | 4.162014E−11 |
| X*Y^4 | C20 | 0.000000E+00 | 0.000000E+00 |
| Y^5 | C21 | −1.432843E−12 | −1.432843E−12 |

The surface data of the mirror part of the example 2 are listed in the following table 8.

TABLE 8

| | Cj | reflection surface |
|---|---|---|
| Y radius of cuevature R | | 2.200309E+03 |
| conic constant | C1 | 4.820375E+01 |
| X | C2 | 0.000000E+00 |

TABLE 8-continued

| | Cj | reflection surface |
|---|---|---|
| Y | C3 | 0.000000E+00 |
| X^2 | C4 | −1.032779E−03 |
| X*Y | C5 | 0.000000E+00 |
| Y^2 | C6 | −5.767935E−04 |
| X^3 | C7 | 0.000000E+00 |
| X^2*Y | C8 | 4.181558E−06 |
| X*Y^2 | C9 | 0.000000E+00 |
| Y^3 | C10 | 9.424649E−06 |
| X^4 | C11 | 1.534243E−08 |
| X^3*Y | C12 | 0.000000E+00 |
| X^2*Y^2 | C13 | −1.059661E−08 |
| X*Y^3 | C14 | 0.000000E+00 |
| Y^4 | C15 | −4.522601E−08 |
| X^5 | C16 | 0.000000E+00 |
| X^4*Y | C17 | −6.555304E−10 |
| X^3*Y^2 | C18 | 0.000000E+00 |
| X^2*Y^3 | C19 | 8.533320E−10 |
| X*Y^4 | C20 | 0.000000E+00 |
| Y^5 | C21 | −1.774170E−10 |

Figure 7A:
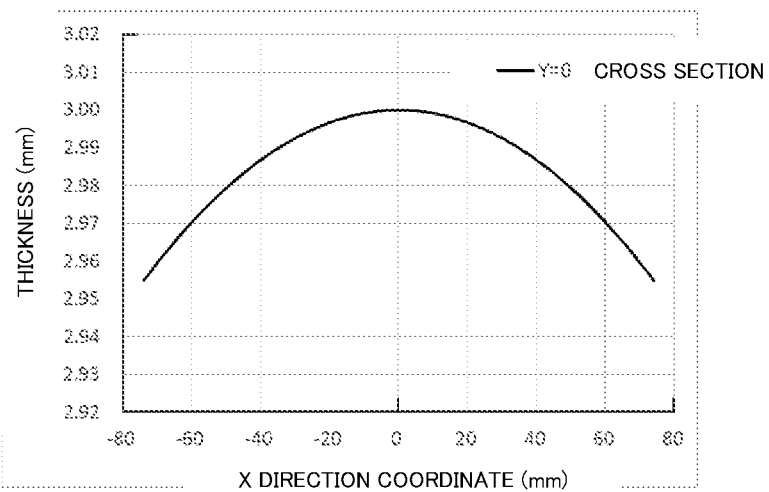
FIG. 7A is a chart illustrating the thickness distribution in the lateral direction along the central lateral cross section of a combiner in a second example.
Figure 7B:
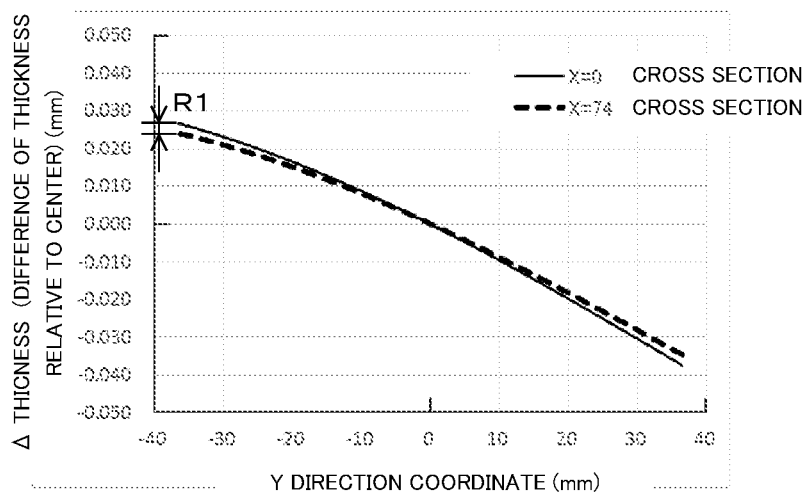
FIG. 7B is a chart illustrating the thickness distribution in the vertical direction of the combiner of the second example.

FIG. 7A illustrates the thickness in the lateral cross section of the combiner 20 of the example 2 and FIG. 7B illustrates the thickness in the vertical cross section of the combiner 20 of the example 2. The combiner 20 of the example 2 has a relatively small curvature and a small enlargement rate. In the chart of FIG. 7A, the horizontal axis indicates the lateral coordinates and the vertical axis indicates the thickness of the combiner 20. Additionally, in FIG. 7B, the horizontal axis indicates vertical coordinates and the vertical axis indicates the relative thickness of the combiner 20. The curve illustrated as a solid line in FIG. 7B indicates the variation of thickness in the vertical direction D1 at the center with regard to the lateral direction D2 of the combiner 20, and the curve illustrated as a dotted line indicates the variation of thickness in the vertical direction D1 at the periphery with regard to the lateral direction D2 of the combiner 20. As can be clearly seen in FIG. 7B, with regard to the thickness of the main body layer 20a of the combiner 20, the variation rate (absolute value) of the thickness in the vertical direction D1 is relatively larger in the +Y or the upper end 20r (see FIG. 3A) corresponding to the other end than in the −Y or the lower end 20q (see FIG. 3A) corresponding to one end. In addition, with regard to the thickness in the vertical direction D1 of the main body layer 20a of the combiner 20, the difference between the variation rates of the thickness in the vertical direction D1 at the upper and the lower ends is larger in the peripheral parts 20j and 20k indicated by the dotted line than in the central vertically-crossing zone 20i with regard to the lateral direction D2 indicated by the solid line. Furthermore, the thickness at the lower end 20q corresponding to one end of the main body layer 20a based on the central laterally-crossing zone 20p passing through the center C1 and extending in the lateral direction D2, i.e., the amount of increase of thickness is smaller by R1 in the peripheral part, i.e., the lateral-end lower region SH20 than in the central part with regard to the lateral direction D2, i.e., the central lower part SH10.

Figure 7C:
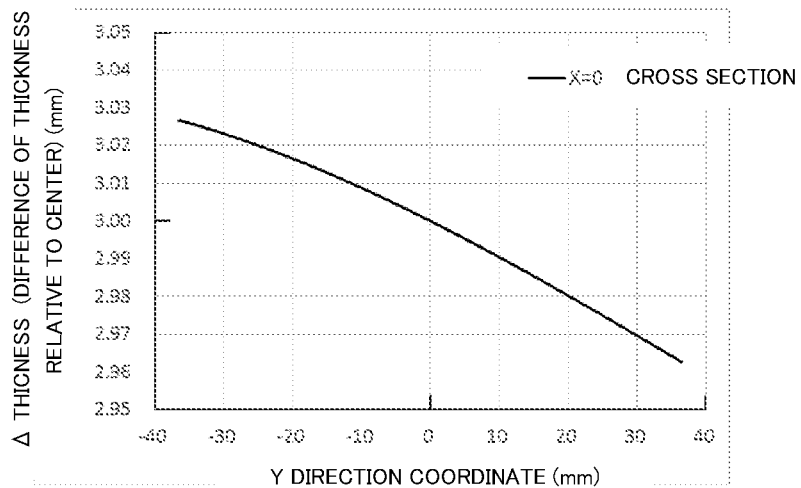
FIG. 7C is a chart illustrating the thickness distribution in the vertical direction of the combiner of the second comparative example.

Referring to FIG. 7C, the thickness in the vertical cross section of the combiner 20 of the comparative example 2 will be described. In such a case, the variation of thickness (solid line) along the vertical direction D1 in the center with regard to the lateral direction D2 of the combiner 20 coincides with the variation of thickness (dotted line) along the vertical direction D1 in the periphery with regard to the lateral direction D2 of the combiner 20.

Figure 8A:
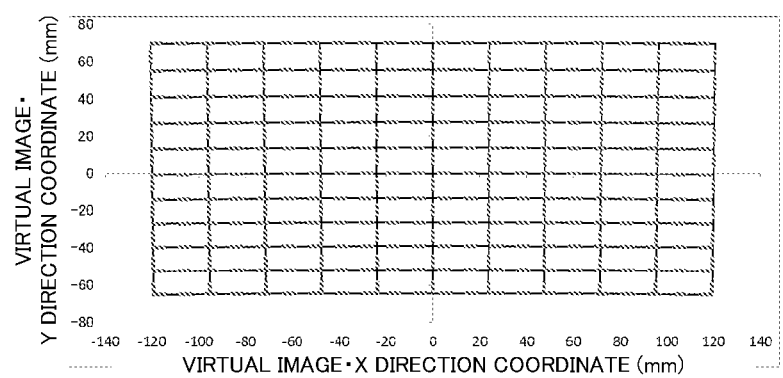
FIG. 8A illustrates a lattice image of the second example in a state being observed at the center of the eye box.
Figure 8B:
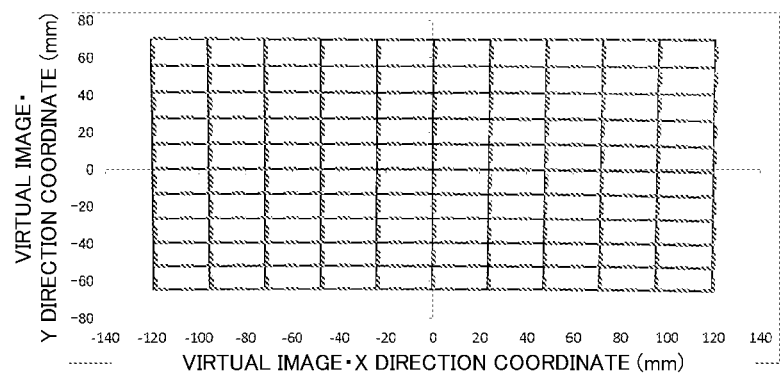
FIG. 8B illustrates a lattice image of the second example in a state being observed at a diagonally upper part of the eye box.

FIG. 8A illustrates a lattice image displayed using the combiner 20 of the example 2 in a state being observed at the center of the eye box SY, and FIG. 8B illustrates a lattice image displayed using the combiner 20 of the example 2 in a state being observed at a diagonally upper part of the eye box SY. As illustrated in FIG. 8A, it can be seen that formation of a double image is avoided in the image being observed at the center of the eye box SY, because the image formed by the dominant display light HK indicated by the solid line generally overlaps with the image formed by the secondary display light HK2 indicated by the dotted line. In addition, as illustrated in FIG. 8B, it can also be seen that formation of a double image is avoided in the image being observed at a corner of the eye box SY, because the image formed by the dominant display light HK indicated by the solid line generally overlaps with the image formed by the secondary display light HK2 indicated by the dotted line.

In the following, a screen and a head-up display device having incorporated therein according to one or more embodiments will be described. Note that the screen or the like of one or more embodiments is a modification of the screen or the like of one or more embodiments described above and items which are not described in particular are similar to those of one or more embodiments described above.

Figure 9A:
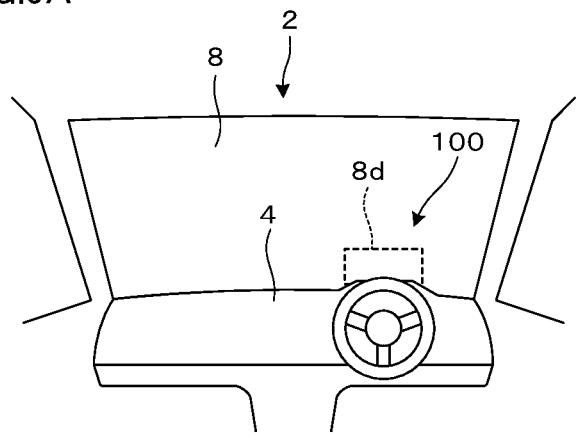
FIG. 9A is a front view seen from the inside of the car and illustrating a windshields or the like, which is a screen of one or more embodiments.
Figure 9B:
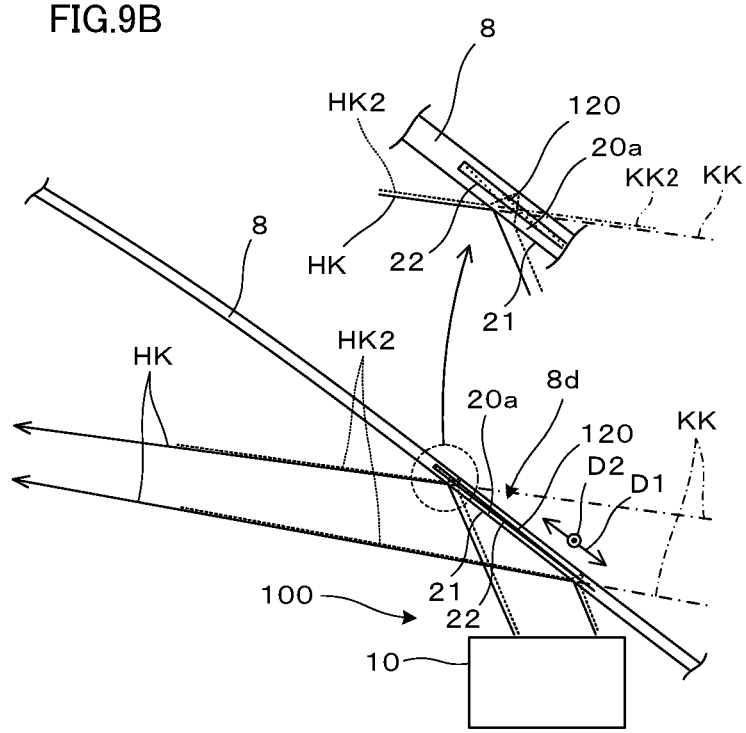
FIG. 9B is a side cross-sectional view illustrating the head-up display device.

As illustrated in FIGS. 9A and 9B, in the case of the head-up display device 100 having incorporated therein the screen according to one or more embodiments, the windshield 8 has a thin intermediate layer 120 embedded therein, and a rectangular reflection region 8d provided on the windshield 8 facing the driving seat functions as the screen. In other words, the screen of one or more embodiments turns out to be the windshield 8 having provided thereon the reflection region 8d, which is the virtual image display region reflecting the display light HK.

The thickness of the intermediate layer 120 increases toward the upper part in a wedge-like manner. In the illustrated example, the inner surface of the windshield 8 functions as the first optical surface 21, and the inner surface of the intermediate layer 120 functions as the second optical surface 22. In such a case, although the shape of the first optical surface 21 may be adjusted to a certain extent by fabricating or processing the inner surface of the windshield 8, the range of adjustment is narrow. The shape of the second optical surface 22 may be adjusted by adjusting the arrangement or thickness of the intermediate layer 120.

In one or more embodiments, adjusting the space or inclination of the second optical surface 22 relative to the first optical surface 21 as appropriate allows for forming a small angle against the virtual image light beam KK which is an extended line of the display light HK reflected by the first optical surface 21, as well as causing the secondary display light HK2 to extend along the extended line of another virtual image light beam KK2 emitted from the same virtual image point. Accordingly, it is possible to avoid formation of a double image due to overlapping with a slight lateral-end displacement of the virtual image formed by the display light HK and the virtual image formed by the secondary display light HK2.

Also in the case of the one or more embodiments, the thickness of the main body layer 20a between the first optical surface 21 and the second optical surface 22 becomes thinner from the center toward the periphery with regard to the lateral direction D2. In addition, the thickness of the main body layer 20a becomes thinner from one end at the lower side toward the other end at the upper side corresponding to the direction in which the display light HK is diagonally incident with regard to the vertical direction D1. Furthermore, the variation of the thickness of the main body layer 20a with regard to the vertical direction D1 at the center of the lateral direction D2 is different from the variation of the thickness of the main body layer 20a with regard to the vertical direction D1 in the peripheral of the lateral direction D2.

In the following, a screen and a head-up display device having incorporated therein according to one or more embodiments will be described. Note that the screen or the like of one or more embodiments is a modification of the screen or the like of tone or more embodiments described above and items which are not described in particular are similar to those of one or more embodiments described above or the like.

Figure 10:
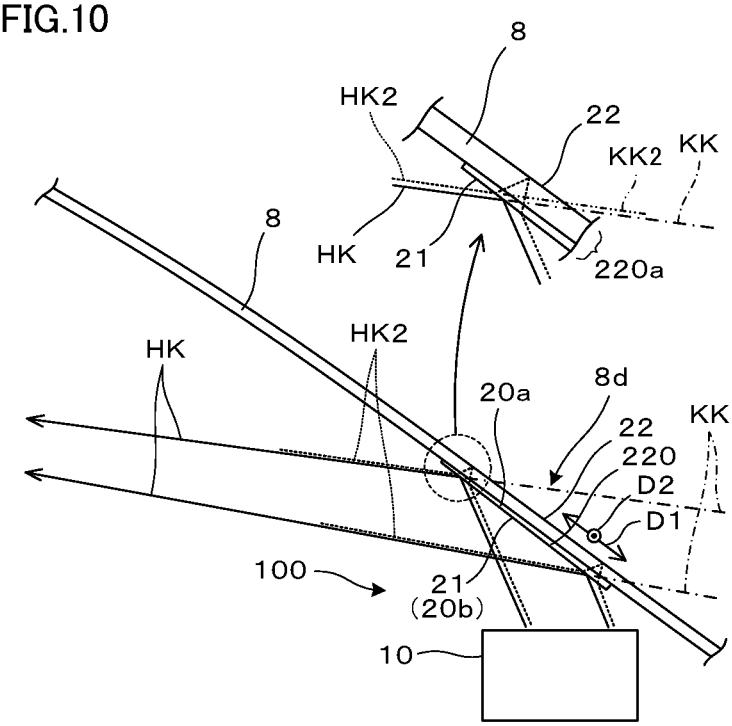
FIG. 10 is a side cross-sectional view illustrating a windshield or the like, which is a screen of one or more embodiments.

As illustrated in FIG. 10, in the case of the head-up display device 100 having incorporated therein the screen according to one or more embodiments, the windshield 8 has a combiner part 220 adhered, as the screen, inside the rectangular reflection region 8d provided on the windshield 8 facing the driving seat. In other words, the screen of one or more embodiments turns out to be the windshield 8 having provided thereon the reflection region 8d, which is the virtual image display region reflecting the display light HK.

In the illustrated example, the inner surface of the combiner part 220 functions as the first optical surface 21, and the outer surface of the windshield 8 functions as the second optical surface 22.

In one or more embodiments, adjusting the space or inclination of the second optical surface 22 relative to the first optical surface 21 as appropriate allows for forming a small angle against the virtual image light beam KK which is an extension of the display light HK reflected by the first optical surface 21, as well as causing the secondary display light HK2 to extend along the extended line of another virtual image light beam KK2 emitted from the same virtual image point. Accordingly, it is possible to avoid formation of a double image due to overlapping with a slight displacement of the virtual image formed by the display light HK and the virtual image formed by the secondary display light HK2.

Also in the case of one or more embodiments, the thickness of the composite main body layer 220a between the first optical surface 21 and the second optical surface 22 becomes thinner from the center toward the periphery with regard to the lateral direction D2. In addition, the thickness of the main body layer 220a becomes thinner from one end at the lower side toward the other end at the upper side corresponding to the direction in which the display light HK is diagonally incident with regard to the vertical direction D1. Furthermore, the variation of the thickness of the main body layer 220a with regard to the vertical direction D1 at the center of the lateral direction D2 is different from the variation of the thickness of the main body layer 220a with regard to the vertical direction D1 in the peripheral of the lateral direction D2.

Although the screen or the like according to embodiments has been described above, the screen or the like according to the present invention is not limited thereto. For example, in one or more embodiments, the arrangement of the head-up display device 100 may be turned upside down so that the combiner 20 may be provided on the upper part of the windshield 8 or at the sun visor position, in which case the combiner 20 is provided diagonally downward ahead of the drawing unit 10.

The outline of the combiner 20 and the outline of the reflection region 8d is not limited to be rectangular, and may have various shapes.

The drawing unit 10 illustrated in FIG. 2 is merely exemplary, in which the mirror 13 may be omitted, or the liquid crystal display panel 11 may be replaced by other types of display elements.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A screen for a head-up display device comprising:
   a main body layer sandwiched between a first concave optical surface at an observation side and a second convex optical surface at a side opposite to the observation side, wherein
   a thickness of the main body layer becomes thinner from a center toward a periphery with regard to a lateral direction perpendicular to a reference plane, and
   a variation of the thickness of the main body layer with regard to a vertical direction parallel to the reference plane is different between the center and the periphery with regard to the lateral direction.

2. The screen according to claim 1, wherein the thickness of the main body layer becomes thinner from one end to the other end in the vertical direction.

3. The screen according to claim 2, wherein a variation rate of the thickness of the main body layer in the vertical direction is larger at the other end than at the one end.

4. The screen according to claim 3, wherein a difference between variation rates of the thickness of the main body layer at both ends with regard to the vertical direction is larger in the periphery than in the center with regard to the lateral direction.

5. The screen according to claim 4, wherein an amount of increase of the thickness at the one end of the main body layer based on a central laterally-crossing zone passing through a center of the vertical direction and extending in the lateral direction is smaller in the periphery than in the center with regard to the lateral direction.

6. The screen according to claim 2, wherein the one end in the vertical direction corresponds to a direction of diagonal incidence of display light, and the other end in the vertical direction corresponds to a direction opposite to the direction of diagonal incidence of display light.

7. The screen according to claim 1, which wherein the screen guides display light emitted from a drawing unit toward different directions as though having been emitted from a same virtual image point.

8. The screen according to claim 1, wherein the screen is a stand-alone combiner which is independently provided and reflects display light.

9. The screen according to claim 8, wherein the second convex optical surface lacks an anti-reflection coating.

10. The screen according to claim 1, wherein the screen is a windshield comprising a virtual image display region that reflects display light.

11. A head-up display device comprising:
    the screen according to claim 1; and
    a drawing unit that projects display light on the screen.

12. The head-up display device according to claim 11, wherein a virtual image formed by the display light reflected by the first optical surface coincides in terms of size and position with a virtual image formed by the display light transmitted through the first optical surface and reflected by the second optical surface.

* * * * *